US009685664B2

(12) United States Patent
Nagumo et al.

(10) Patent No.: US 9,685,664 B2
(45) Date of Patent: Jun. 20, 2017

(54) FUEL CELL STACK (71) Applicant: HONDA MOTOR CO., LTD., Tokyo (JP)

(72) Inventors: Kenji Nagumo, Wako (JP); Kentaro Ishida, Wako (JP); Keisuke Suda, Wako (JP); Yuji Asano, Wako (JP); Akihiro Matsui, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 218 days.

(21) Appl. No.: 14/591,919

(22) Filed: Jan. 8, 2015

(65) Prior Publication Data

US 2015/0200414 A1 Jul. 16, 2015

(30) Foreign Application Priority Data

Jan. 10, 2014 (JP) ................. 2014-003663

(51) Int. Cl.
*H01M 8/24* (2016.01)
*H01M 8/04* (2016.01)
(Continued)

(52) U.S. Cl.
CPC ......... *H01M 8/026* (2013.01); *H01M 8/0254* (2013.01); *H01M 8/0206* (2013.01); *H01M 2008/1095* (2013.01)

(58) Field of Classification Search
CPC ............. H01M 8/0202; H01M 8/0258; H01M 8/0267; H01M 8/2483; H01M 8/026; H01M 8/0263; H01M 8/0265; H01M 8/0254
See application file for complete search history.

(56) References Cited

U.S. PATENT DOCUMENTS 8,304,140 B2 11/2012 Sugiura et al.
8,399,151 B2 3/2013 Sugiura et al.
(Continued)

FOREIGN PATENT DOCUMENTS

JP 5128861 B2 1/2009
JP 2010-272360 12/2010
(Continued)

OTHER PUBLICATIONS

Japanese Office Action for corresponding JP Application No. 2014-003663, Jan. 10, 2017 (w/ English machine translation).

Primary Examiner — Carlos Barcena
(74) Attorney, Agent, or Firm — Mori & Ward, LLP (57) ABSTRACT A fuel cell stack includes fuel cells, a reactant gas channel, a reactant gas inlet manifold, a reactant gas outlet manifold, an inlet buffer portion, and an outlet buffer portion. A reactant gas flows through the reactant gas channel along a surface of a separator. The reactant gas flows through the reactant gas inlet manifold and the reactant gas outlet manifold in a stacking direction. The inlet buffer portion connects an inlet of the reactant gas channel to the reactant gas inlet manifold. The inlet buffer portion includes linear inlet guide protrusions. Inlet guide channels are provided between the linear inlet guide protrusions and connect the reactant gas inlet manifold to the reactant gas channel. A pitch between the linear inlet guide protrusions increases in accordance with an increase in a distance from the reactant gas inlet manifold to the linear inlet guide protrusions.

6 Claims, 5 Drawing Sheets (51) Int. Cl.
*H01M 8/026* (2016.01)
*H01M 8/0254* (2016.01)
*H01M 8/1018* (2016.01)
*H01M 8/0206* (2016.01)

(56) References Cited

U.S. PATENT DOCUMENTS

| | | |
|---|---|---|
| 8,524,416 B2 | 9/2013 | Ishida et al. |
| 8,778,554 B2 | 7/2014 | Goto et al. |
| 2005/0084731 A1* | 4/2005 | Nishimura .......... H01M 8/0258 429/413 |
| 2008/0070080 A1 | 3/2008 | Miyazaki |
| 2012/0094208 A1 | 4/2012 | Sugiura et al. |

FOREIGN PATENT DOCUMENTS

| | | |
|---|---|---|
| JP | 2010-282868 | 12/2010 |
| JP | 2011-076973 | 4/2011 |
| JP | 2013-131355 | 7/2013 |
| JP | 2013-258107 | 12/2013 |

* cited by examiner

FUEL CELL STACK

CROSS-REFERENCE TO RELATED APPLICATIONS

The present application claims priority under 35 U.S.C. §119 to Japanese Patent Application No. 2014-003663, filed Jan. 10, 2014, entitled "Fuel Cell Stack." The contents of this application are incorporated herein by reference in their entirety.

BACKGROUND

1. Field

The present disclosure relates to a fuel cell stack.

2. Description of the Related Art

For example, a solid polymer electrolyte fuel cell includes a membrane electrode assembly (MEA), in which an anode electrode is disposed on one side of a solid-polymer electrolyte membrane and a cathode electrode is disposed on the other side of the solid-polymer electrolyte membrane. The solid-polymer electrolyte membrane is made from a polymer ion-exchange membrane. The MEA and a pair of separators, sandwiching the MEA therebetween, constitute a power generation cell (unit cell). Several tens to several hundreds of such power generation cells are stacked and used, for example, as a vehicle fuel cell stack.

A fuel cell usually has a so-called internal manifold structure for supplying a fuel gas and an oxidant gas, each of which is a reactant gas, respectively to anode electrodes and cathode electrodes of power generation cells that are stacked. The internal manifold structure includes a reactant gas inlet manifold and a reactant gas outlet manifold, each extending through the power generation cells in a direction in which the power generation cells are stacked. The reactant gas inlet manifold and the reactant gas outlet manifold (hereinafter, each of which may be referred to as a reactant gas manifold) are respectively connected to an inlet and an outlet of a reactant gas channel, through which the reactant gas is supplied along an electrode surface.

In this case, the reactant gas manifold has a comparatively small opening area. Accordingly, in order to allow the reactant gas to smoothly flow through the reactant gas channel, it is necessary to provide buffer portions (an inlet buffer portion and an outlet buffer portion), for diffusing the reactant gas, near the reactant gas manifold.

For example, Japanese Patent No. 5128861 describes a fuel cell in which the size of a buffer portion is reduced as much as possible and with which a desirable power generation performance can be obtained with a lightweight and compact structure.

In this fuel cell, a separator includes an inlet buffer portion, which is substantially triangular and is located near an inlet of a reactant gas channel, and an outlet buffer portion, which is substantially triangular and is located near an outlet of the reactant gas channel. The average pressure losses of the inlet buffer portion and the outlet buffer portion are each lower than or equal to the average pressure loss of the reactant gas channel. Accordingly, the flow rate of a reactant gas through the reactant gas channel can be made uniform, and it is possible to uniformly supply the reactant gas from a reactant gas manifold to the entire surface of the reactant gas channel.

SUMMARY

According to one aspect of the present invention, a fuel cell stack includes a plurality of fuel cells, a reactant gas channel, a reactant gas inlet manifold, a reactant gas outlet manifold, an inlet buffer portion, and an outlet buffer portion. The plurality of fuel cells are stacked. Each of the fuel cells includes a membrane electrode assembly and a separator that are stacked. The membrane electrode assembly includes an electrolyte membrane and a pair of electrodes sandwiching the electrolyte membrane therebetween. A reactant gas flows through the reactant gas channel along a surface of the separator. The reactant gas flows through the reactant gas inlet manifold and the reactant gas outlet manifold in a direction in which the separator is stacked. The inlet buffer portion connects an inlet of the reactant gas channel to the reactant gas inlet manifold. The outlet buffer portion connects an outlet of the reactant gas channel to the reactant gas outlet manifold. The inlet buffer portion includes a plurality of linear inlet guide protrusions, and inlet guide channels, which connect the reactant gas inlet manifold to the reactant gas channel, are formed between the linear inlet guide protrusions. A pitch between the linear inlet guide protrusions increases with increasing distance from the reactant gas inlet manifold.

According to another aspect of the present invention, a fuel cell stack includes a plurality of fuel cells, a reactant gas channel, a reactant gas inlet manifold, a reactant gas outlet manifold, an inlet buffer portion, and an outlet buffer portion. The plurality of fuel cells are stacked. Each of the fuel cells includes a membrane electrode assembly and a separator that are stacked. The membrane electrode assembly includes an electrolyte membrane and a pair of electrodes sandwiching the electrolyte membrane therebetween. A reactant gas flows through the reactant gas channel along a surface of the separator. The reactant gas flows through the reactant gas inlet manifold and the reactant gas outlet manifold in a direction in which the separator is stacked. The inlet buffer portion connects an inlet of the reactant gas channel to the reactant gas inlet manifold. The outlet buffer portion connects an outlet of the reactant gas channel to the reactant gas outlet manifold. The reactant gas inlet manifold is disposed above the inlet buffer portion in a vertical direction. The inlet buffer portion includes a plurality of linear inlet guide protrusions, and inlet guide channels, which connect the reactant gas inlet manifold to the reactant gas channel, are formed between the linear inlet guide protrusions. The outlet buffer portion includes a plurality of linear outlet guide protrusions, and outlet guide channels, which connect the reactant gas outlet manifold to the reactant gas channel, are formed between the linear outlet guide protrusions. A closing member is disposed only in a space between an uppermost one of the linear inlet guide protrusions that is most adjacent to the reactant gas inlet manifold and another of the linear inlet guide protrusions that is adjacent to the uppermost one of the linear inlet guide protrusions.

According to further aspect of the present invention, a fuel cell stack includes fuel cells, a reactant gas channel, a reactant gas inlet manifold, a reactant gas outlet manifold, an inlet buffer portion, and an outlet buffer portion. The fuel cells are stacked in a stacking direction. Each of the fuel cells includes a membrane electrode assembly and a separator that are stacked in the stacking direction. The membrane electrode assembly includes an electrolyte membrane and first and second electrodes sandwiching the electrolyte membrane between the first and second electrodes in the stacking direction. A reactant gas flows through the reactant gas channel along a surface of the separator. The reactant gas flows through the reactant gas inlet manifold and the reactant gas outlet manifold in the stacking direction. The inlet buffer portion connects an inlet of the reactant gas channel to the reactant gas inlet manifold. The inlet buffer portion includes linear inlet guide protrusions. Inlet guide channels are provided between the linear inlet guide protrusions and connect the reactant gas inlet manifold to the reactant gas channel. A pitch between the linear inlet guide protrusions increases in accordance with an increase in a distance from the reactant gas inlet manifold to the linear inlet guide protrusions. The outlet buffer portion connects an outlet of the reactant gas channel to the reactant gas outlet manifold.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
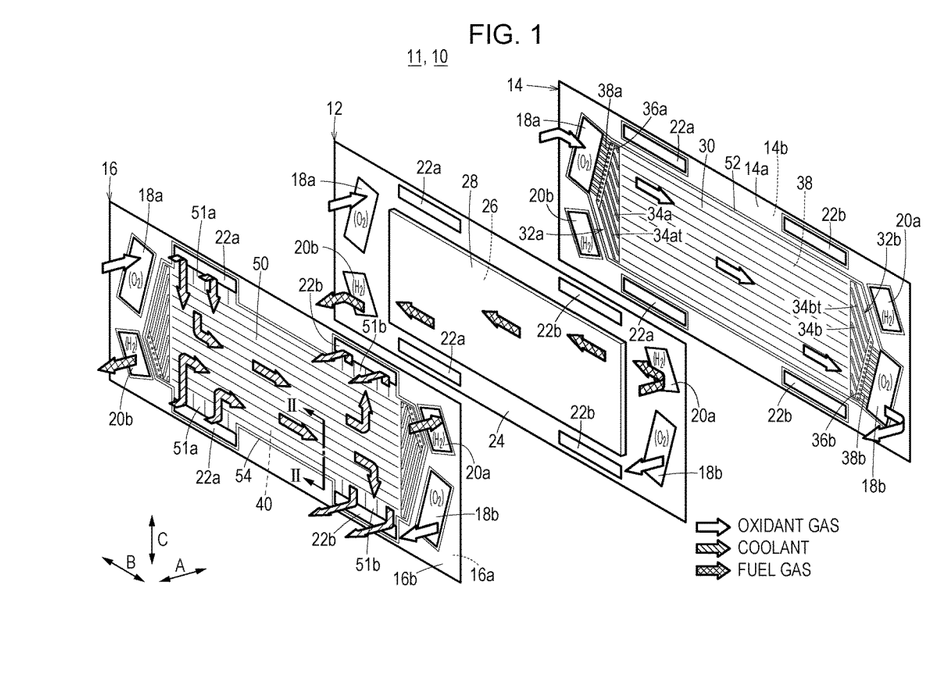
FIG. 1 is an exploded partial perspective view of a fuel cell of a fuel cell stack according to an embodiment of the present disclosure.
Figure 2:
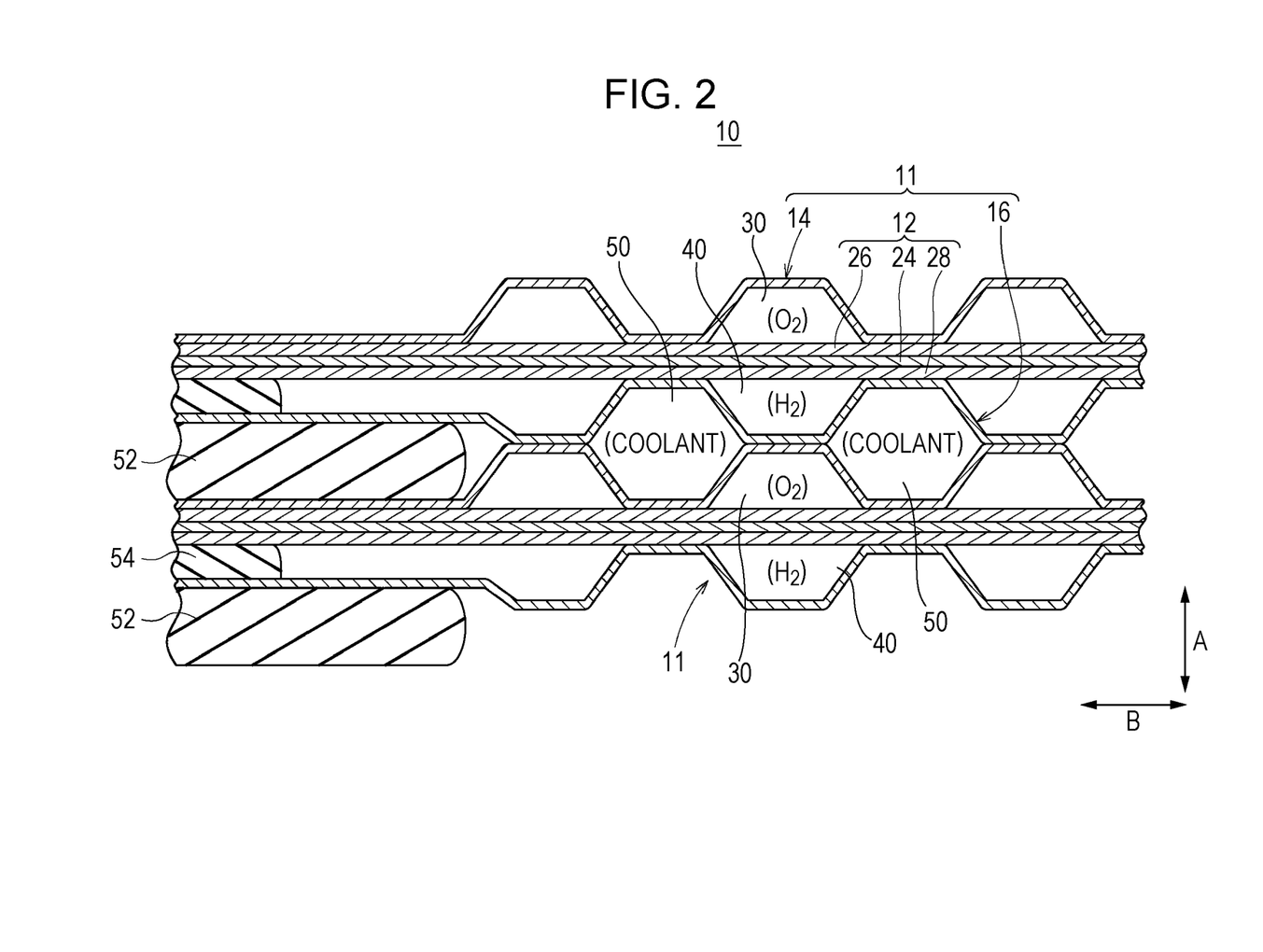
FIG. 2 is a sectional view of the fuel cell taken along line II-II in FIG. 1.

As illustrated in FIGS. 1 and 2, a fuel cell stack 10 according to an embodiment of the present disclosure includes a plurality of fuel cells 11 that are stacked in the direction of arrow A. Each of the fuel cells 11 is disposed in an upright position (so that the surfaces of electrodes thereof extend in the vertical direction). For example, the fuel cell stack 10 is mounted in a fuel cell electric vehicle (not shown).

Each of the fuel cells 11 includes a membrane electrode assembly 12 (MEA), and a cathode separator 14 and an anode separator 16, sandwiching the membrane electrode assembly 12 therebetween.

Each of the cathode separator 14 and the anode separator 16 is a thin plate-shaped metal separator that is made from, for example, a steel plate, a stainless steel plate, an aluminum plate, a galvanized steel plate, or any of these metal plates having an anti-corrosion coating on the surface thereof. The metal separator has a rectangular shape in plan view and is press-formed so as to have a corrugated cross section. For example, the cathode separator 14 and the anode separator 16 may be carbon separators, instead of being metal separators.

As illustrated in FIG. 1, each of the cathode separator 14 and the anode separator 16 has a horizontally elongated rectangular shape having a short side extending in the vertical direction (indicated by arrow C) and a long side extending in a horizontal direction (direction of arrow B). (The cathode separator 14 and the anode separator 16 are stacked in a horizontal direction.)

An oxidant gas inlet manifold 18a (reactant gas inlet manifold) and a fuel gas outlet manifold 20b (reactant gas outlet manifold) are formed in the fuel cell 11 so as to extend in the direction of arrow A through one end portion (near one of short sides) of the fuel cell 11 in the longitudinal direction (the direction of arrow B). An oxidant gas, such as an oxygen-containing gas, is supplied through the oxidant gas inlet manifold 18a. A fuel gas, such as a hydrogen-containing gas, is discharged through the fuel gas outlet manifold 20b.

A fuel gas inlet manifold 20a (reactant gas inlet manifold) and an oxidant gas outlet manifold 18b (reactant gas outlet manifold) are formed in the fuel cell 11 so as to extend in the direction of arrow A through the other end portion (near the other short side) of the fuel cell 11 in the longitudinal direction. The fuel gas is supplied through the fuel gas inlet manifold 20a. The oxidant gas is discharged through the oxidant gas outlet manifold 18b.

A pair of coolant inlet manifolds 22a are formed in the fuel cell 11 so as to extend in the direction of arrow A at one end portions, near the oxidant gas inlet manifold 18a, of the fuel cell 11 in the transversal direction (direction of arrow C). A coolant is supplied through the pair of coolant inlet manifolds 22a. A pair of coolant outlet manifolds 22b are formed in the fuel cell 11 so as to extend at the other end portions, near the fuel gas inlet manifold 20a, of the fuel cell 11 in the transversal direction. The coolant is discharged through the pair of coolant outlet manifolds 22b.

As illustrated in FIGS. 1 and 2, the membrane electrode assembly 12 includes a solid polymer electrolyte membrane 24, and a cathode electrode 26 and an anode electrode 28 sandwiching the solid polymer electrolyte membrane 24 therebetween. The solid polymer electrolyte membrane 24 is, for example, a cation-exchange membrane that is made of a fluoro-polymer or a hydrocarbon-polymer.

The cathode electrode 26 and the anode electrode 28 each include a gas diffusion layer (not shown) and an electrode catalyst layer (not shown). The gas diffusion layer is made of carbon paper or the like. The electrode catalyst layer is formed by uniformly coating a surface of the gas diffusion layer with porous carbon particles whose surfaces support a platinum alloy. The electrode catalyst layers are disposed on both sides of the solid polymer electrolyte membrane 24.

Figure 3:
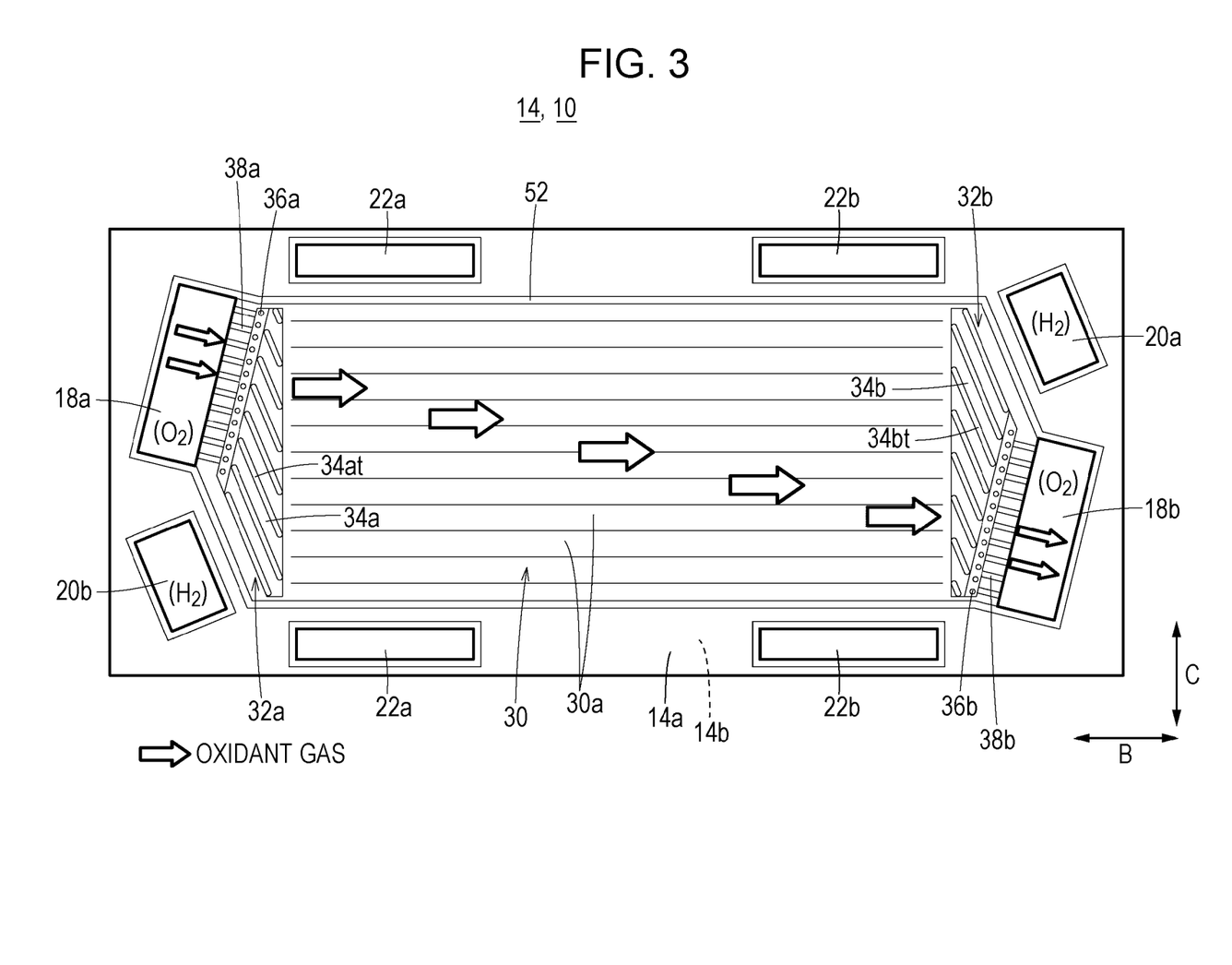
FIG. 3 is a plan view of a cathode separator of the fuel cell.

As illustrated in FIG. 3, an oxidant gas channel 30 (reactant gas channel), through which the oxidant gas inlet manifold 18a is connected to the oxidant gas outlet manifold 18b, is formed on a surface 14a of the cathode separator 14 facing the membrane electrode assembly 12. The oxidant gas channel 30 includes a plurality of linear (or wave-shaped) channel grooves 30a that extend in the horizontal direction (direction of arrow B) and that allow the oxidant gas to flow in the longitudinal direction along the surface 14a of the cathode separator 14.

An inlet buffer portion 32a is disposed near an inlet of the oxidant gas channel 30. An outlet buffer portion 32b is disposed near an outlet of the oxidant gas channel 30. The oxidant gas inlet manifold 18a is disposed above the inlet buffer portion 32a in the vertical direction. The inlet buffer portion 32a includes a plurality of linear inlet guide protrusions 34at. A plurality of inlet guide channels 34a, which connect the oxidant gas inlet manifold 18a to the oxidant gas channel 30 and have substantially the same cross-sectional area, are formed between the linear inlet guide protrusions 34at.

The linear inlet guide protrusions 34*at* are inclined with respect to the horizontal direction downward toward the oxidant gas channel 30. The linear inlet guide protrusions 34*at* are disposed at a uniform pitch (distance). The inlet buffer portion 32*a* includes an embossed portion 36*a* that is located near an inlet of the inlet guide channel 34*a*. A plurality of inlet connection channels 38*a* are formed between the embossed portion 36*a* and the oxidant gas inlet manifold 18*a*.

The outlet buffer portion 32*b* includes a plurality of linear outlet guide protrusions 34*bt*. A plurality of outlet guide channels 34*b*, which connect the oxidant gas outlet manifold 18*b* to the oxidant gas channel 30 and have substantially the same cross-sectional area, are formed between the linear outlet guide protrusions 34*bt*.

The linear outlet guide protrusions 34*bt* are inclined with respect to the horizontal direction upward toward the oxidant gas channel 30. The linear outlet guide protrusions 34*bt* are disposed at a uniform pitch (distance). The outlet buffer portion 32*b* includes an embossed portion 36*b* that is located near an outlet of the outlet guide channel 34*b*. A plurality of outlet connection channels 38*b* are formed between the embossed portion 36*b* and the oxidant gas outlet manifold 18*b*.

Figure 4:
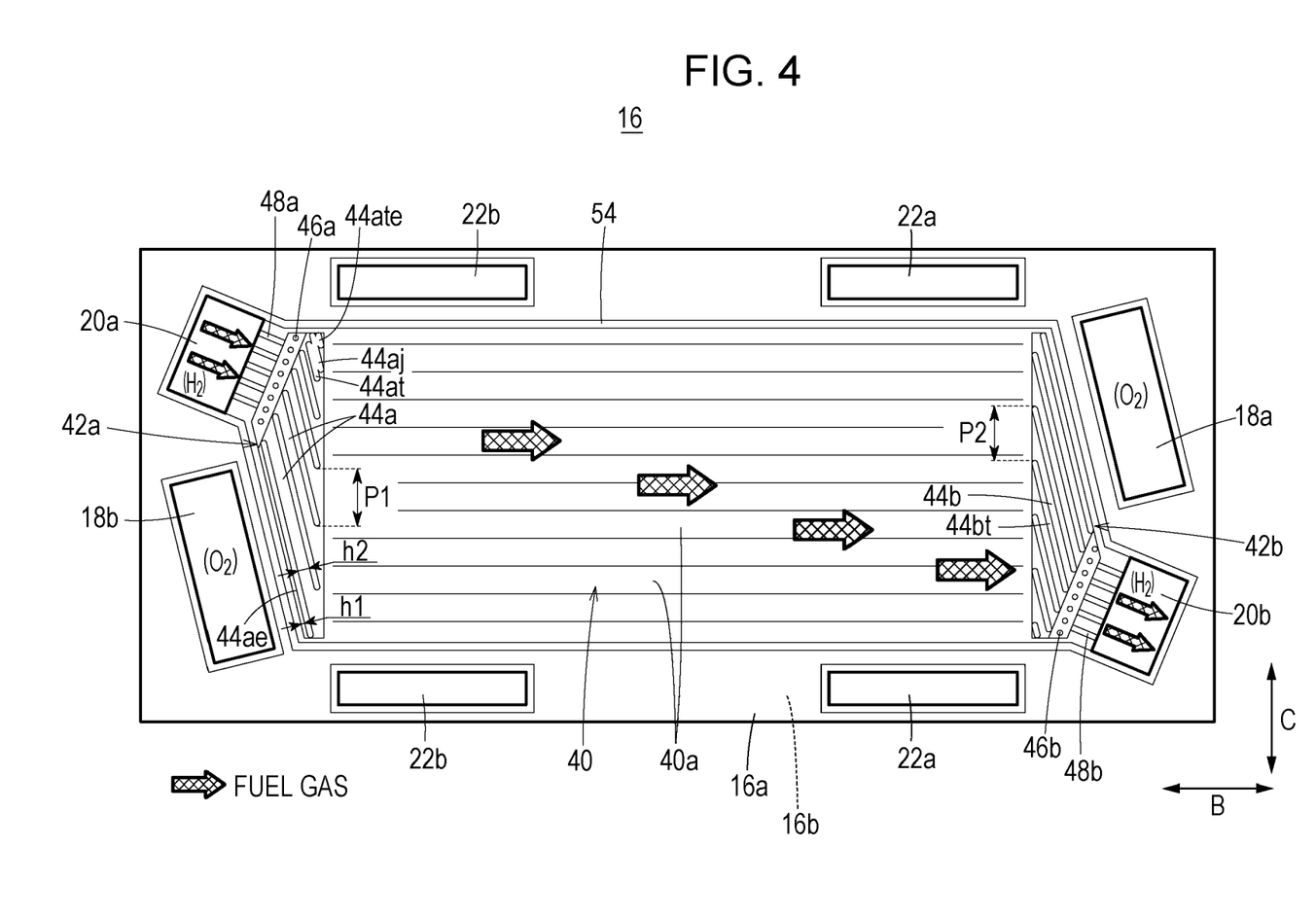
FIG. 4 is a plan view of an anode separator of the fuel cell.

As illustrated in FIG. 4, a fuel gas channel 40, through which the fuel gas inlet manifold 20*a* is connected to the fuel gas outlet manifold 20*b*, is formed on a surface 16*a* of the anode separator 16 facing the membrane electrode assembly 12. The fuel gas channel 40 includes a plurality of linear (or wave-shaped) channel grooves 40*a* that extend in the horizontal direction (direction of arrow B) and that allow the fuel gas to flow in the longitudinal direction along the surface 16*a* of the anode separator 16.

An inlet buffer portion 42*a* is disposed near an inlet of the fuel gas channel 40. An outlet buffer portion 42*b* is disposed near an outlet of the fuel gas channel 40. The fuel gas inlet manifold 20*a* is disposed above the inlet buffer portion 42*a* in the vertical direction. The inlet buffer portion 42*a* includes a plurality of linear inlet guide protrusions 44*at*. A plurality of inlet guide channels 44*a*, which connect the fuel gas inlet manifold 20*a* to the fuel gas channel 40, are formed between the linear inlet guide protrusions 44*at*.

The linear inlet guide protrusions 44*at* have substantially the same width and are inclined with respect to the horizontal direction downward toward the fuel gas channel 40. The pitch P1 (distance) between the linear inlet guide protrusions 44*at* increases with increasing distance from the fuel gas inlet manifold 20*a*. The channel width h1 of a lowermost inlet guide channel 44*ae*, which is one of the linear inlet guide protrusions 44*at* that is most distant from the fuel gas inlet manifold 20*a*, is smaller than the channel width h2 of any one of the other inlet guide channels 44*a*. The channel width h2 increases with increasing distance from the fuel gas inlet manifold 20*a*.

A space between an uppermost linear inlet guide protrusion 44*ate*, which is one of the linear inlet guide protrusions 44*at* that is most adjacent to the fuel gas inlet manifold 20*a*, and another of the linear inlet guide protrusions 44*at* that is adjacent to the uppermost linear inlet guide protrusion 44*ate* is closed with a closing member 44*aj*. In practice, the closing member 44*aj* is formed by filling the space between the uppermost linear inlet guide protrusion 44*ate* and the adjacent linear inlet guide protrusion 44*at* with a material that is the same as those of these protrusions.

The inlet buffer portion 42*a* includes an embossed portion 46*a* that is located near an inlet of the inlet guide channel 44*a*. A plurality of inlet connection channels 48*a* are formed between the embossed portion 46*a* and the fuel gas inlet manifold 20*a*.

The outlet buffer portion 42*b* includes a plurality of linear outlet guide protrusions 44*bt*. Outlet guide channels 44*b*, which connect the fuel gas outlet manifold 20*b* to the fuel gas channel 40, are formed between the linear outlet guide protrusions 44*bt*. The outlet buffer portion 42*b* is unsymmetrical to the inlet buffer portion 42*a*.

The linear outlet guide protrusions 44*bt* have substantially the same width, are inclined with respect to the horizontal direction upward toward the fuel gas channel 40, and are disposed at a uniform pitch P2 (distance). The outlet buffer portion 42*b* includes an embossed portion 46*b* that is located near an outlet of the outlet guide channel 44*b*. A plurality of outlet connection channels 48*b* are formed between the embossed portion 46*b* and the fuel gas outlet manifold 20*b*.

As illustrated in FIG. 1, a part of a coolant channel 50, through which the pair of coolant inlet manifolds 22*a* are connected to the pair of coolant outlet manifolds 22*b*, is formed on a surface 16*b* of the anode separator 16. The coolant channel 50 is formed between the back side of the oxidant gas channel 30 and the back side of the fuel gas channel 40. A plurality of inlet connection channels 51*a* are disposed near each of the coolant inlet manifold 22*a*. A plurality of outlet connection channels 51*b* are disposed near each of the coolant outlet manifold 22*b*.

A first sealing member 52 is integrally formed on the surface 14*a* and a surface 14*b* of the cathode separator 14 so as to surround the outer peripheral end portion of the cathode separator 14. A second sealing member 54 is integrally formed on the surface 16*a* and the surface 16*b* of the anode separator 16 so as to surround the outer peripheral end portion of the anode separator 16.

Each of the first sealing member 52 and the second sealing member 54 is made of an elastic material such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene-rubber, and acrylic rubber.

The operation of the fuel cell stack 10 having the aforementioned structure will be described below.

First, as illustrated in FIG. 1, an oxidant gas, such as an oxygen-containing gas, is supplied to the oxidant gas inlet manifold 18*a*. A fuel gas, such as a hydrogen-containing gas, is supplied to the fuel gas inlet manifold 20*a*. A coolant, such as pure water, ethylene glycol, or oil, is supplied to the pair of coolant inlet manifolds 22*a*.

As illustrated in FIGS. 1 and 3, the oxidant gas flows from the oxidant gas inlet manifold 18*a* through the inlet connection channels 38*a* and the inlet buffer portion 32*a*, and is introduced into the oxidant gas channel 30 of the cathode separator 14. The oxidant gas flows along the oxidant gas channel 30 in the direction of arrow B (horizontal direction), and is supplied to the cathode electrode 26 of the membrane electrode assembly 12.

As illustrated in FIG. 4, the fuel gas flows from the fuel gas inlet manifold 20*a* through the inlet connection channels 48*a* and the inlet buffer portion 42*a*, and is introduced into the fuel gas channel 40 of the anode separator 16. The fuel gas flows along the fuel gas channel 40 in the horizontal direction (direction of arrow B), and is supplied to the anode electrode 28 of the membrane electrode assembly 12 (see FIG. 1).

Accordingly, in the membrane electrode assembly 12, the oxidant gas supplied to the cathode electrode 26 and the fuel gas supplied to the anode electrode 28 are consumed in electrochemical reactions in the electrode catalyst layers, and therefore electric power is generated.

Next, as illustrated in FIGS. 1 and 3, the oxidant gas, which has been supplied to the cathode electrode 26 of the membrane electrode assembly 12 and consumed, passes through the outlet buffer portion 32b and the outlet connection channels 38b, and is discharged along the oxidant gas outlet manifold 18b in the direction of arrow A. As illustrated in FIG. 4, the fuel gas, which has been supplied to the anode electrode 28 of the membrane electrode assembly 12 and consumed, passes through the outlet buffer portion 42b and the outlet connection channels 48b, and is discharged along the fuel gas outlet manifold 20b in the direction of arrow A.

The coolant, which has been supplied to the pair of coolant inlet manifolds 22a, is introduced into the coolant channel 50 between the cathode separator 14 and the anode separator 16. As illustrated in FIG. 1, the coolant temporarily flows inward in the direction of arrow C (vertical direction), then flows in the direction of arrow B (horizontal direction), and cools the membrane electrode assembly 12. Then, the coolant flows outward in the direction of arrow C and is discharged to the pair of coolant outlet manifolds 22b.

As illustrated in FIG. 4, in the present embodiment, the inlet buffer portion 42a is disposed near an inlet of the fuel gas channel 40. The inlet buffer portion 42a includes the plurality of linear inlet guide protrusions 44at. The pitch P1 (distance) between the linear inlet guide protrusions 44at successively increases with increasing distance from the fuel gas inlet manifold 20a. Therefore, the channel width of each of the inlet guide channels 44a, which connect the fuel gas inlet manifold 20a to the fuel gas channel 40, increases with increasing distance from the fuel gas inlet manifold 20a, that is, with increasing difficulty for the reactant gas to flow through the inlet guide channel 44a.

The distribution of the fuel gas supplied to the fuel gas channel 40 is compared between the structure according to the present application (present application example) and an existing structure (related-art example). The existing structure is a structure in which the linear inlet guide protrusions 44at are separated from each other at a uniform pitch. In the structure of the related-art example, the pressure losses of the inlet guide channels 44a that are distant from the fuel gas inlet manifold 20a tend to become larger than those of the inlet guide channels 44a that are adjacent to the fuel gas inlet manifold 20a.

Figure 5:
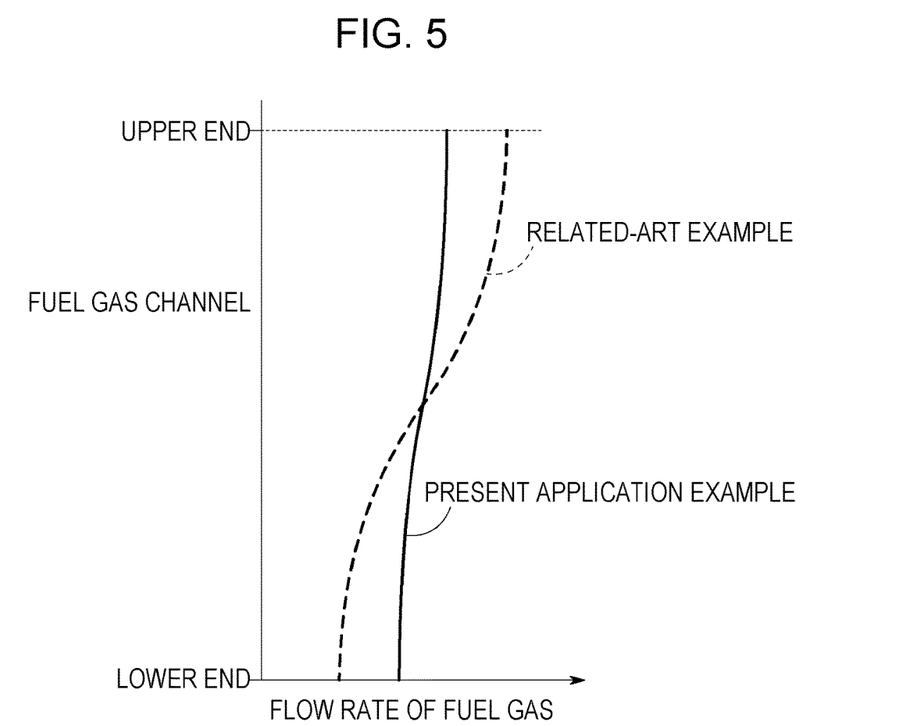
FIG. 5 is a graph representing the flow rate of a fuel gas supplied to a fuel gas channel, illustrating a comparison between a present application example and a related-art example.

As a result, as illustrated in FIG. 5, a large amount of fuel gas flows from the fuel gas inlet manifold 20a to an end portion (near the upper end) of the inlet buffer portion 42a, and only a small amount of fuel gas flows to a middle portion and a lower portion (near the lower end) of the inlet buffer portion 42a. Therefore, the existing structure has problems in that the fuel gas is not uniformly supplied to a power generation section and in that the durability and the power-generation stability decrease. This problem occurs because the distribution of water content and the distribution of water content gradient in the plane direction are deteriorated, the minimum stoichiometry in the plane direction decreases, and the water removal performance decreases.

In contrast, in the present application example, the channel width of each of the inlet guide channels 44a increases with increasing difficulty for the fuel gas to flow through the inlet guide channel 44a. Accordingly, it is possible to supply the same amount of fuel gas to the inlet guide channels 44a through which it is difficult for the fuel gas to flow and to the inlet guide channels 44a through which it is easy for the fuel gas to flow. Therefore, the distribution of the flow rate of the fuel gas can be optimized over the entire width of the fuel gas channel 40. Thus, an advantage can be obtained in that it is possible to uniformly supply a reactant gas to the entire surface of the fuel gas channel 40 with a simple and economical structure.

Moreover, in the present embodiment, a space between the uppermost linear inlet guide protrusion 44ate, which is one of the linear inlet guide protrusions 44at that is most adjacent to the fuel gas inlet manifold 20a, and one of the linear inlet guide protrusions 44at that is adjacent to the uppermost linear inlet guide protrusion 44ate is closed with the closing member 44aj. Therefore, it is possible to suppress flow of a large amount of fuel gas through the space between the linear inlet guide protrusions 44ate and 44at, which are most adjacent to the fuel gas inlet manifold 20a.

Furthermore, the channel width h1 of the lowermost inlet guide channel 44ae, which is one of the inlet guide channels 44a that is most distant from the fuel gas inlet manifold 20a, is smaller than the channel width h2 of any other one of the inlet guide channels 44a. The fuel gas supplied to the lowermost inlet guide channel 44ae easily flows along a lower portion of the fuel gas channel 40, and therefore a large amount of fuel gas may flow. Accordingly, by reducing the channel width h1 of the lowermost inlet guide channel 44ae, it is possible to appropriately reduce the flow rate of the fuel gas that flows in a lower portion of the fuel gas channel 40.

Thus, an advantage can be obtained in that it is possible to uniformly and efficiently supply the fuel gas to the entire surface of the fuel gas channel 40 and to appropriately obtain a desirable power generation performance.

In the present embodiment, the fuel cell 11 includes the membrane electrode assembly 12, that is, a single MEA, and the cathode separator 14 and the anode separator 16, that is, a pair of separators. However, this is not a limitation. For example, the present disclosure can be applied to a fuel cell stack in which unit cells are stacked, each of the unit cells including two MEAs and three separators (between which the MEAs are disposed). The anode separator 16 may have a buffer structure the same as that of the cathode separator 14.

A fuel cell stack according to an aspect of the present disclosure includes a plurality of fuel cells that are stacked, each of the fuel cells including a membrane electrode assembly and a separator that are stacked, the membrane electrode assembly including an electrolyte membrane and a pair of electrodes sandwiching the electrolyte membrane therebetween.

The fuel cell stack includes a reactant gas channel through which a reactant gas flows along a surface of the separator, and a reactant gas inlet manifold and a reactant gas outlet manifold through which the reactant gas flows in a direction in which the separator is stacked. The fuel cell stack includes an inlet buffer portion that connects an inlet of the reactant gas channel to the reactant gas inlet manifold, and an outlet buffer portion that connects an outlet of the reactant gas channel to the reactant gas outlet manifold.

The inlet buffer portion includes a plurality of linear inlet guide protrusions, and inlet guide channels, which connect the reactant gas inlet manifold to the reactant gas channel, are formed between the linear inlet guide protrusions. A pitch between the linear inlet guide protrusions increases with increasing distance from the reactant gas inlet manifold.

It is preferable that the outlet buffer portion includes a plurality of linear outlet guide protrusions, and outlet guide channels, which connect the reactant gas outlet manifold to the reactant gas channel, be formed between the linear outlet guide protrusions; and it is preferable that a pitch between the linear outlet guide protrusions be uniform.

It is preferable that a channel width of one of the inlet guide channels that is most distant from the reactant gas inlet manifold be smaller a channel width of any one of the other inlet guide channels.

It is preferable that a space between one of the linear inlet guide protrusions that is most adjacent to the reactant gas inlet manifold and another of the linear inlet guide protrusions that is adjacent to the one of the linear inlet guide protrusions is closed with a closing member.

In a fuel cell stack according to another aspect of the present disclosure, a reactant gas inlet manifold is disposed above an inlet buffer portion in a vertical direction. The inlet buffer portion includes a plurality of linear inlet guide protrusions, and inlet guide channels, which connect the reactant gas inlet manifold to a reactant gas channel, are formed between the linear inlet guide protrusions. An outlet buffer portion includes a plurality of linear outlet guide protrusions, and outlet guide channels, which connect a reactant gas outlet manifold to the reactant gas channel, are formed between the linear outlet guide protrusions.

In this fuel cell stack, a closing member is disposed only in a space between an uppermost one of the linear inlet guide protrusions that is most adjacent to the reactant gas inlet manifold and another of the linear inlet guide protrusions that is adjacent to the uppermost one of the linear inlet guide protrusions.

It is preferable that a channel width of a lowermost one of the inlet guide channels that is most distant from the reactant gas inlet manifold be smaller than a channel width of any one of the other inlet guide channels.

According to the present disclosure, a pitch between the linear inlet guide protrusions increases with increasing distance from the reactant gas inlet manifold. Therefore, the channel width of each of the inlet guide channels, which connect the reactant gas inlet manifold to the reactant gas channel, increases with increasing distance from the reactant gas inlet manifold, that is, with increasing difficulty for the reactant gas to flow through the inlet guide channel.

Accordingly, it is possible to supply the same amount of reactant gas to the inlet guide channels through which it is difficult for the reactant gas to flow and to the inlet guide channels through which it is easy for the reactant gas to flow. Therefore, the distribution of the flow rate of the reactant gas can be optimized over the entire width of the reactant gas channel. Thus, it is possible to uniformly supply a reactant gas to the entire surface of the reactant gas channel with a simple and economical structure.

Moreover, in the present disclosure, only a space between the uppermost linear inlet guide protrusion, which is one of the linear inlet guide protrusions that is most adjacent to the reactant gas inlet manifold, and one of the linear inlet guide protrusions that is adjacent to the uppermost linear inlet guide protrusion is closed with the closing member. Accordingly, it is possible to suppress flow of a large amount of reactant gas through the space between these linear inlet guide protrusions, which are most adjacent to the reactant gas inlet manifold. As a result, it is possible to uniformly supply the reactant gas to the entire surface of the reactant gas channel. Thus, it is possible to appropriately obtain a desirable power generation performance and a high durability.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell stack comprising:
   a plurality of fuel cells that are stacked, each of the fuel cells including a membrane electrode assembly and a separator that are stacked, the membrane electrode assembly including an electrolyte membrane and a pair of electrodes sandwiching the electrolyte membrane therebetween;
   a reactant gas channel through which a reactant gas flows along a surface of the separator;
   a reactant gas inlet manifold and a reactant gas outlet manifold through which the reactant gas flows in a direction in which the separator is stacked;
   an inlet buffer portion that connects an inlet of the reactant gas channel to the reactant gas inlet manifold; and
   an outlet buffer portion that connects an outlet of the reactant gas channel to the reactant gas outlet manifold,
   wherein the inlet buffer portion includes a plurality of linear inlet guide protrusions, and inlet guide channels, which connect the reactant gas inlet manifold to the reactant gas channel, are formed between the linear inlet guide protrusions,
   wherein a pitch between the linear inlet guide protrusions increases with increasing distance from the reactant gas inlet manifold,
   wherein the outlet buffer portion includes a plurality of linear outlet guide protrusions, and outlet guide channels, which connect the reactant gas outlet manifold to the reactant gas channel, are formed between the linear outlet guide protrusions, and
   wherein a pitch between the linear outlet guide protrusions is uniform.

2. The fuel cell stack according to claim 1,
   wherein a channel width of one of the inlet guide channels that is most distant from the reactant gas inlet manifold is smaller than a channel width of any one of the other inlet guide channels.

3. A fuel cell stack comprising:
   a plurality of fuel cells that are stacked, each of the fuel cells including a membrane electrode assembly and a separator that are stacked, the membrane electrode assembly including an electrolyte membrane and a pair of electrodes sandwiching the electrolyte membrane therebetween;
   a reactant gas channel through which a reactant gas flows along a surface of the separator;
   a reactant gas inlet manifold and a reactant gas outlet manifold through which the reactant gas flows in a direction in which the separator is stacked;
   an inlet buffer portion that connects an inlet of the reactant gas channel to the reactant gas inlet manifold; and
   an outlet buffer portion that connects an outlet of the reactant gas channel to the reactant gas outlet manifold,
   wherein the inlet buffer portion includes a plurality of linear inlet guide protrusions, and inlet guide channels, which connect the reactant gas inlet manifold to the reactant gas channel, are formed between the linear inlet guide protrusions,
   wherein a pitch between the linear inlet guide protrusions increases with increasing distance from the reactant gas inlet manifold, and wherein a space between one of the linear inlet guide protrusions that is most adjacent to the reactant gas inlet manifold and another of the linear inlet guide protrusions that is adjacent to the one of the linear inlet guide protrusions is closed with a closing member.

4. A fuel cell stack comprising:

fuel cells stacked in a stacking direction, each of the fuel cells including a membrane electrode assembly and a separator that are stacked in the stacking direction, the membrane electrode assembly including an electrolyte membrane and first and second electrodes sandwiching the electrolyte membrane between the first and second electrodes in the stacking direction;

a reactant gas channel through which a reactant gas flows along a surface of the separator;

a reactant gas inlet manifold and a reactant gas outlet manifold through which the reactant gas flows in the stacking direction;

an inlet buffer portion connecting an inlet of the reactant gas channel to the reactant gas inlet manifold, the inlet buffer portion including linear inlet guide protrusions, inlet guide channels being provided between the linear inlet guide protrusions and connecting the reactant gas inlet manifold to the reactant gas channel, a pitch between the linear inlet guide protrusions increasing in accordance with an increase in a distance from the reactant gas inlet manifold to the linear inlet guide protrusions; and an outlet buffer portion connecting an outlet of the reactant gas channel to the reactant gas outlet manifold, wherein the outlet buffer portion includes linear outlet guide protrusions, wherein outlet guide channels are provided between the linear outlet guide protrusions and connect the reactant gas outlet manifold to the reactant gas channel, and wherein a pitch between the linear outlet guide protrusions is uniform.

5. The fuel cell stack according to claim 4, wherein a channel width of one of the inlet guide channels that is most distant from the reactant gas inlet manifold is smaller than a channel width of any one of other inlet guide channels.

6. A fuel cell stack comprising:

fuel cells stacked in a stacking direction, each of the fuel cells including a membrane electrode assembly and a separator that are stacked in the stacking direction, the membrane electrode assembly including an electrolyte membrane and first and second electrodes sandwiching the electrolyte membrane between the first and second electrodes in the stacking direction;

a reactant gas channel through which a reactant gas flows along a surface of the separator;

a reactant gas inlet manifold and a reactant gas outlet manifold through which the reactant gas flows in the stacking direction;

an inlet buffer portion connecting an inlet of the reactant gas channel to the reactant gas inlet manifold, the inlet buffer portion including linear inlet guide protrusions, inlet guide channels being provided between the linear inlet guide protrusions and connecting the reactant gas inlet manifold to the reactant gas channel, a pitch between the linear inlet guide protrusions increasing in accordance with an increase in a distance from the reactant gas inlet manifold to the linear inlet guide protrusions; and an outlet buffer portion connecting an outlet of the reactant gas channel to the reactant gas outlet manifold, wherein a space between one of the linear inlet guide protrusions that is most adjacent to the reactant gas inlet manifold and another of the linear inlet guide protrusions that is adjacent to the one of the linear inlet guide protrusions is closed with a closing member.

* * * * *